(12) United States Patent
Uehara (10) Patent No.: US 6,945,332 B2
(45) Date of Patent: Sep. 20, 2005

(54) AERATION TINE DEVICE (75) Inventor: Kenji Uehara, Takasaki (JP)

(73) Assignee: Kashiwatool Corporation, (JP)

( * ) Notice: Subject to any disclaimer, the term of this patent is extended or adjusted under 35 U.S.C. 154(b) by 0 days.

(21) Appl. No.: 10/760,578

(22) Filed: Jan. 20, 2004

(65) Prior Publication Data
US 2005/0167126 A1    Aug. 4, 2005

(51) Int. Cl.⁷ .............................................. A01B 45/02
(52) U.S. Cl. .................... 172/22; 172/745; 172/747; 172/772.5
(58) Field of Search ............................... 172/22, 21, 745, 172/747, 772, 772.5; 29/891, 525.01, 525.13, 29/525.14, 33 B, 237, DIG. 38, DIG. 48, 29/DIG. 104

(56) References Cited

U.S. PATENT DOCUMENTS

| 3,586,109 A | | 6/1971 | Eversole et al. ............... 172/22 |
| 3,838,497 A | * | 10/1974 | Rizzitano et al. ........... 228/212 |
| 4,662,456 A | | 5/1987 | Classen ....................... 172/22 |
| 4,723,607 A | | 2/1988 | Hansen ........................ 172/22 |
| 4,881,602 A | | 11/1989 | Hansen et al. ................. 172/22 |
| 4,924,944 A | * | 5/1990 | Cozine et al. ................ 172/22 |
| 5,203,488 A | * | 4/1993 | Wang et al. ................ 228/127 |
| 5,495,895 A | | 3/1996 | Sakamoto ..................... 172/22 |
| 6,003,612 A | | 12/1999 | Knight et al. ................. 172/20 |
| 6,505,687 B1 | | 1/2003 | Wichmann ................... 172/22 |
| 6,513,603 B2 | | 2/2003 | Bjorge ......................... 172/22 |
| 6,752,219 B1 | * | 6/2004 | Fridd .......................... 172/22 |
| 2003/0037715 A1 | * | 2/2003 | Santa Cruz et al. ......... 111/7.1 |
| 2003/0047330 A1 | | 3/2003 | Bjorge ......................... 172/21 |

FOREIGN PATENT DOCUMENTS

JP            406098604 A  *  4/1994

* cited by examiner

Primary Examiner—Christopher J. Novosad
(74) Attorney, Agent, or Firm—Welsh & Katz, Ltd.

(57) ABSTRACT

A highly durable aeration tine device attached to a soil aerator has a tubular tine member extending cylindrically and a hard metal tip made of a hard metal material and typically made in a frustum shape of a cone, which is in an area contact with the tubular tine member between the surfaces of the tubular tine member and the hard metal tip. Each surface of the tubular tine member and the hard metal tip is extending in a plane perpendicular to the axial direction and can be fabricated easily, and the drive force provided from the soil aerator can be transmitted without loss.

11 Claims, 5 Drawing Sheets

III—III

AERATION TINE DEVICE

BACKGROUND OF THE INVENTION

1. Field of the Invention

This invention relates to an aeration tine device for aerating turf and soil and, more particularly, to an aeration tine device with a side-ejecting opening suitable for aerating turf of a wide lawn surface such as golf courses.

2. Description of Related Art

Turf aeration is to open channels in the soil for air and water movement and gas exchange in the root zone, and traditional turf aeration involves the process of punching holes in the soil and removing a portion of the soil and thatch layer via a coring or spooning action. To improve soil aeration, turf aeration tine devices are used for extracting plugs of turf, thatch and soil. There are two basic types of aerators: solid tine, hollow tine or core. Solid tine aeration is often called spiking and involves making a hole in the sod by pushing turf and sub-surface thatch and into the root zone. Although this type of aeration is beneficial, it does not bring cores to the surface, which slows the breakdown of thatch. Hollow tine aeration speeds up the decomposition of thatch by bringing soil and thatch to the surface where air, water and microbes vigorously break down thatch.

In hollow tine aeration, the aeration tines commonly have a generally tubular shape with a tapered hollow point designed so that a portion of turf and soil enters into the tip of the tine and is ejected through the other end or a side opening of the tine. Such tines are spiked downward as the tapered point of the aeration tine device is punched toward the turf surface with prescribed force by a turf aerator generally having wheels to move the working site. The turf aerator generally has plural tine arms for detachably attaching a number of tines, and during operation, each tine arm moves up and down reciprocally to spike the turf surface.

Numerous types of turf aeration apparatus have been developed to accomplish the process of core cultivation. Tine devices of hollow type can be found in, e.g., U.S. Pat. Nos. 4,924,944 and 5,495,895. In U.S. Pat. No. 4,924,944, a pair of tube shaped tine members and a center bar member are coupled at each generally rectangular upper end portion of the tine member to form a side ejecting double coring tine device. Each tine member has a circular lower end having an opening in communication with a side opening provided at a center stem to facilitate penetration into the turf. In U.S. Pat. No. 5,495,895, a tine device is illustrated as having a circular edge formed by thinning the forefront portion of a pipe material and having a head portion having a slightly larger diameter at the base end. The tine device is formed with an elongated hole for driving out of soil. The upper and lower end portions of the elongated hole are obliquely cut off to form sloped surfaces. The tine devices are of the form of a sharpened slightly tapered hollow metal tube, which may be vertically inserted and withdrawn from grass turf so as to extract a core.

Repetitive insertions of the tine device into the turf bring continual wearing on the tine metal member due to friction against the turf. Such wearing changes the length and the diameter of the tube member, and the operator has to replace the worn tine with a new tine to keep the coring operation in an accurate manner. One of the conventional efforts to solve such a problem is to provide a hard wearing resistant ring element that is fixed to the lower end of the tine. U.S. Pat. No. 3,586,109, describes a tubelike tine for being driven endwise into the turf, especially the turf of golf greens, which is characterized by the provision of an extremely hard wear-resistant element fixed to the working end of the tine.

The tine device described in U.S. Pat. No. 3,586,109, however, raises some problems when doing aeration to soil and turf. Sand and soil may easily stuff up the tubelike tine having an opening at a lower end of thereof, and if stuffed up once, the tine hardly recovers from the stuffed state because the tine repeatedly spikes the surface of soil and turf and because such a repeating action makes harder the stuffed soil placed in the interior of the tine. The tine also causes more friction at the lightly protruded surface of the hard tip provided at the lower end of the tine. Since the tine is moved reciprocally up and down as to spike the surface of turf and soil, the protruded hard tip portion is subject to higher friction when the tine is moved up and down reciprocally. This friction makes uneasy the soil aeration work in use of the tine of this type and may resultantly break down the tine as to separate the hard tip from the tine body portion as a worse situation. To prevent such a hard tip portion from separating, a possible solution is to increase the area adhering between the hard tip portion and the tine body portion. Fabrication of the tapered portion of the tine body portion as to render the contact area wider, however, brings higher costs, and since the tapered surface comes closely to extend parallel to the axial direction, spiking force may not be adequately transmitted to the hard tip from the tine body portion where the tapered face of the hard tip and the tapered end of the tine body portion face obliquely with respect to the axial direction of the tine.

SUMMARY OF THE INVENTION

It is an object of the invention to provide an aeration tine device durable even where used for many number of turf sites. It is another object of the invention to provide an aeration tine device smoothly operational in having excellent controllability and adequately discarding soil plugs.

Foregoing objects are accomplished by providing an aeration tine device including: a tubular tine member extending along an axial direction thereof between a lower end portion and an upper end portion and having a lower opening bored at a center of a lower end surface, and a long side ejection opening in communication with the lower opening, the lower end surface being extending in a plane perpendicular to the axial direction; and a hard metal tip made of a hard metal material having a tapered distal end portion formed with a tip opening and a proximal end portion formed with a proximal opening bored at a center of a proximal end surface in communication with the tip opening, the proximal end surface extending in a plane perpendicular to the axial direction and coupling in an area contact with the lower end surface of the tubular tine member. Because the hard metal tip is connected to the tubular tine member in the area contact at a plane perpendicular to the axial direction, force exerted in the axial direction of the tubular tine member from the soil aerator when spiking the soil surface does not produce any divided force at the area contact region, thereby propelling the hard metal tip into the soil with full force. In addition, because the contact area between the hard metal tip and the tubular tine member is in the plane perpendicular to the axial direction, such contact surfaces can be furnished relatively easily and provide strong connection between the hard metal tip and the tubular tine member.

In accordance with the preferred embodiments, the proximal end surface preferably has an outer diameter substantially equal to an outer diameter of the lower end of the tubular tine member. Where the hard metal tip and the tubular tine member are connected as having the substantially equal outer diameter, the tine device can be smoothly pushed and pulled without resistance at the contact area between the hard metal tip and the tubular tine member. The hard metal tip may have the tip opening whose diameter is narrower than the diameter of the proximal opening. Where the diameter of the tip opening is narrower than the diameter of the proximal opening, plugs can be easily released from the interior of the hard metal tip or the tubular tine member, because the plugs tend to have a diameter smaller than that of the proximal opening.

In another aspect of the invention, an aeration tine device attached to a soil aerator, includes: a tubular tine member extending along an axial direction thereof between a lower end portion and an upper end portion and having a lower opening bored at a center of a lower end surface, and a long side ejection opening in communication with the lower opening, the lower end surface being extending in a plane perpendicular to the axial direction; a hard metal tip made of a hard metal material having a tapered distal end portion formed with a tip opening and a proximal end portion formed with a proximal opening bored at a center of a proximal end surface in communication with the tip opening, the proximal end surface extending in a plane perpendicular to the axial direction and coupling in an area contact with the lower end surface of the tubular tine member; and a metal foil insertion placed between the lower end surface of the tubular tine member and the proximal end surface of the hard metal tip for connecting the tubular tine member with the hard metal tip by brazing. The metal foil insertion operates for relaxing stresses produced due to differences between thermal coefficients of the metal hard tip and the tubular tine member.

Furthermore, in yet another aspect of the invention, an aeration tine device attached to a soil aerator, includes: a tubular tine member extending along an axial direction thereof between a lower end portion and an upper end portion and having a lower opening bored at a center of a lower end surface, and a long side ejection opening in communication with the lower opening, the lower end surface being extending in a plane perpendicular to the axial direction; the long side ejection opening having a back slope formed in a united body with the tubular tine member rising in a curving manner from an inter surface of the tubular tine member; and a hard metal tip made of a hard metal material having a tapered distal end portion formed with a tip opening and a proximal end portion formed with a proximal opening bored at a center of a proximal end surface in communication with the tip opening, the proximal end surface extending in a plane perpendicular to the axial direction and coupling in an area contact with the lower end surface of the tubular tine member.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF THE PREFERRED EMBODIMENTS

Figure 1:
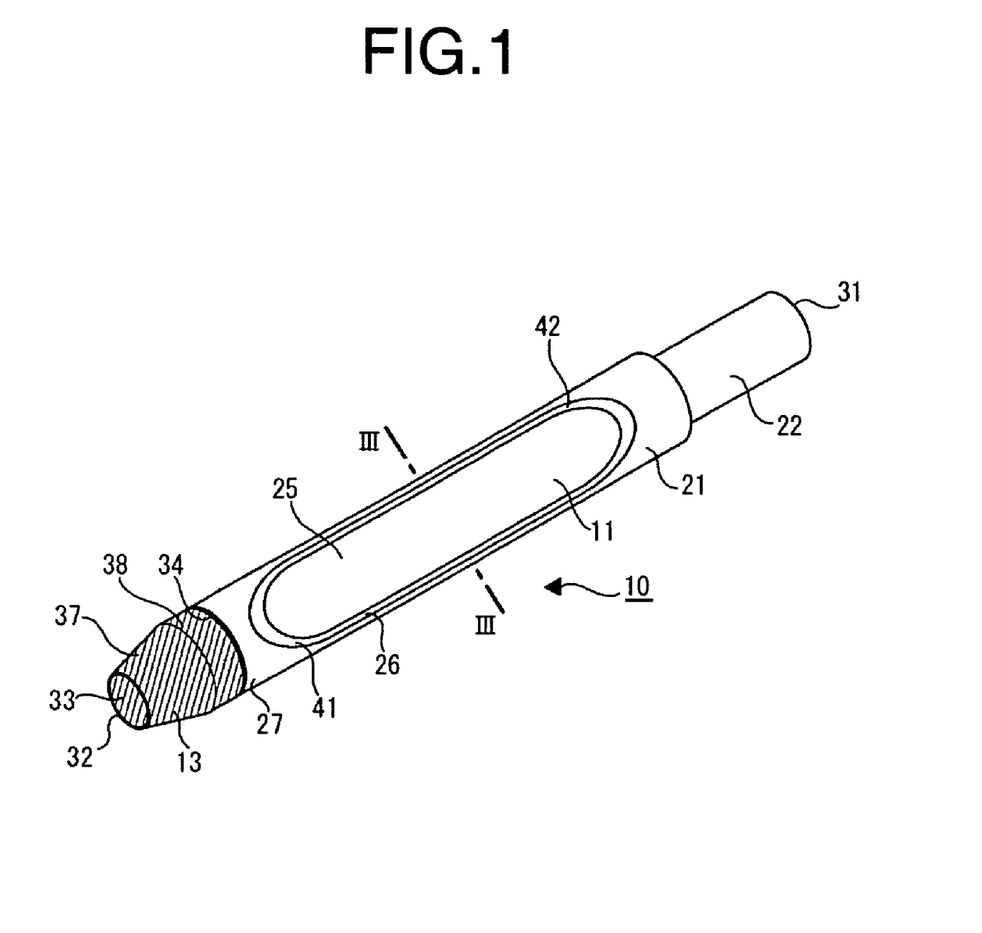
FIG. 1 is a perspective view showing an aeration tine device according to an embodiment of the invention.

Referring to FIGS. 1 to 5, an aeration tine device according to an embodiment of the invention is described. As shown in FIG. 1, the aeration tine device 10 according to the embodiment is chiefly constituted of a tubular tine member 11 in a tubular shape and a hard metal tip 13 having a frustum shape of a cone. This aeration tine device 10 is generally attached in a plural number to reciprocally moving arms of a soil aerator machine when used for turf aeration work on golf courses, soccer fields, etc.

The tubular tine member 11 is made of a carbon steel or alloy steel. The structural material for making the tubular tine member 11 can be selected from relatively hard durable materials such as carbon steels and alloy steels, but may be selected from other materials such as stainless steel, and forged steel or cast steel according to use or purpose of the tine. The tubular tine member 11 is in a substantially cylindrical shape extending longitudinally along an axial direction of the tine member between a lower end portion 27 and an upper end portion 22. The tubular tine member 11 has a hollow interior connecting a lower opening 29 bored at a center of a lower end surface 28 with a long side ejection opening 26.

The upper end portion 22 is formed with an attachment shaft 31 to be fitted to a mounting bracket of the arm of the soil aerator machine, not shown. Because the arm of the soil aerator machine can vary in size and shape, the attachment shaft 31 can be made in different shapes according to mounting portions of the arm. One of such variations is the attachment shaft 31 has a flat portion extending parallel to the axial direction of the tine member to be secured by fastening a screw provided at the arm so that an distal end of the screw is bolted as to clamp the upper end portion 22 to the arm. Another variation in the attachment shaft 31 is formed with a key groove having a corresponding shape to a key provided on the arm side. The upper end portion 22 is in a cylindrical shape as to allow the axial direction orienting to the downward direction when the arm is moved down to spike the ground. The attachment shaft 31 is in a united body with the working section 21 of the tubular tine member 11, but as modifications, the attachment shaft 31 can be made interchangeably attachable to the working section so as to be mounted in any other soil aerator machines. In addition, adaptors or other applicators in cylindrical shapes or other shapes may be used for this aeration tine device 10 to be mounted in any other soil aerator machines. Although illustrated in FIG. 1 is that the attachment shaft 31 has a smaller diameter than that of the working section 21, the attachment shaft 31 can have a larger diameter than that of the working section 21.

Figure 2:
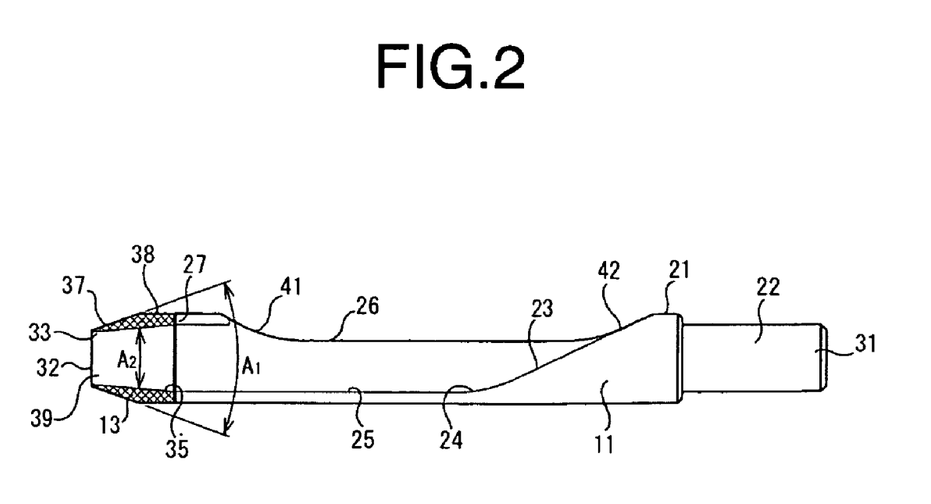
FIG. 2 is a cross section showing the aeration tine device according to the embodiment of the invention.

The tubular tine member 11 is a cylindrical rigid body to be spiked into a soil ground and to transmit the pushing and pulling force to the hard metal tip 13. The length of the tubular tine member 11 may vary depending on the purpose of soil aeration work or the machine specification, and typically has a size from about 3 inches to 15 inches. The outer diameter of the working section 21 of the tubular tine member 11 may also vary depending on the purpose of soil aeration work or the machine specification, and typically has a size of about 0.1 inch to 1 inch. The tubular tine member 11 is of a side opening type and has a hollow interior 25 connecting to the long side ejection opening 26 for ejection soil and turf entered into the tubular tine member 11 from the tip opening 32 of the hard metal tip 13. The hollow interior 25 in this embodiment is made by shaving a hard steel rod in many directions. The lower opening 29 bored at the center of the lower end surface 28, as the lower end of the hollow interior 25, is drilled by a drilling machine to extend the opening along the axial direction. The long side ejection opening 26 is cut out from the peripheral surface of the working section 21 to connect to the drilled bore made in extending in the axial direction. The long side ejection opening 26 extends in the axial direction approximately three fourths or four fifths of the entire length of the working section 21. The cutout edge of the long side ejection opening 26 has respective smoothly curved slopes 41, 42 at the lower and upper ends as shown in FIG. 2. The curved slope 42 located at the upper end of the long side ejection opening 26 is continuous to a back slope 23 rising smoothly from a bottom of the hollow interior 25. Particularly, a connection point 24 between the hollow interior 25 and the back slope 23 is a smoothly curved seamless surface as shown in FIG. 2, and therefore, the soil entered in the hollow interior 25 moves with little friction along the surfaces of the bottom of the hollow interior and the back slope 23 and is ejected excellently from the working section 21. The rising angle of the back slope 23 can be set in a proper angle around 15 to 45 degrees. If the rising angle is too steep, the soil ejection may be done with much friction, whereas if the rising angle is too gentle, the back slope 23 extends lengthily, and fabrication of the hollow interior 25 and the back slope 23 may take more time.

Figure 3:
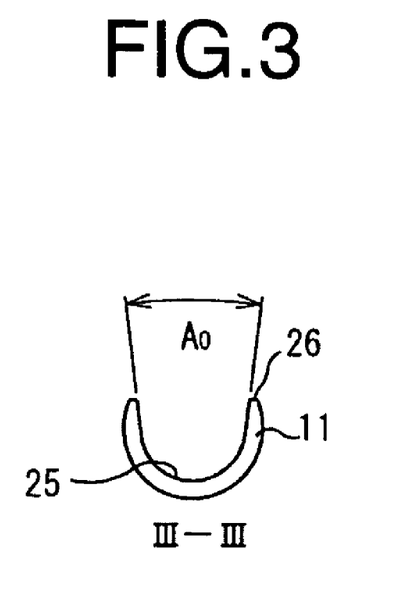
FIG. 3 is a cross section showing the aeration tine device according to the embodiment of the invention taken along III—III line in FIG. 1.

With this tubular tine member 11, the hollow interior 25 has a unique cross section in a plane perpendicular to the axial direction of the tubular tine member 11. As shown in FIG. 3, the inner surface of the hollow interior 25 has a letter-U shape cross section which becomes wider as approaching closely to the long side ejection opening 26. Although the long side ejection opening 26 has a thinner thickness at the edge of the opening, this letter-U shaped cross section is designed to smoothly eject the soil and turf entered in the hollow interior 25, so that plugs of the soil easily come out of the tubular tine member 11. The angle $A_0$ between the hollow interior's inner walls facing to each other at the edges of the long side ejection opening 26 may be set around from ten to twenty degrees according to easiness of fabrication and kind of soils to be spiked. This angle $A_0$ renders soil plugs easily come out of the long side ejection opening 26 of the aeration tine device 10.

The lower end surface 28 of the tubular tine member 11 is extending in a plane perpendicular to the axial direction. Because the lower end surface 28 extends perpendicularly to the direction of the force given from the arm of the soil aeration machine, the force can be efficiently transmitted to the hard metal tip 13 without producing any divisional force having vector in an axial direction. Furthermore, since the lower end surface 28 is a flat surface extending in a plane perpendicular to the axial direction, the lower end surface 28 is easily fabricated by a machine for surface grinding upon holding the working section 21 or the upper end portion 22. If the lower end surface 28 is tapered, fabrication becomes so complicated takes more time.

The lower opening 29 bored at the center of the lower end surface 28 extends along the axial direction and forms the inner surface of the hollow interior 25. The lower opening 29 has a size slightly smaller than the outer diameter of the working section 21, e.g., 0.05 inch to 0.1 inch, depending on the use of the aeration tine device. In this embodiment, the bore drilled at the lower opening 29 extends parallel to the axial direction of the tubular tine member 11, the bore may be formed as to have a slight tapered angle to render smooth the ejection of soil. The hollow interior 25 may have some coating to reduce friction and increase durability of the tubular tine member.

The hard metal tip 13 is a small piece device provided at the lowest portion of the aeration tine device 10. The hard metal tip 13 is essentially made of such as tungsten carbide, titanium carbide, or cermet, which has been known as one of hard metal materials. Typically, such hard metals are manufactured by preparing as starting material powders, such as tungsten carbide powder, other metal powder and cobalt powder, each of which had an average particle size of 1 to 5 microns or less than one micron for higher grade. These powders are blended into the compositions and are subjected to wet mixing in a ball mill for a couple of days and dried. Then, the mixed powders are pressed under a high pressure into green compacts. The green compacts are sintered and formed into, e.g., a tungsten carbide-based cemented material in a desired shape. Thin layers made of such as boron carbon nitride, carbon nitride, or diamond like carbon, etc., may be formed on the surface of the hard metal tip 13 if extra durability is needed.

The hard metal tip 13 has a combined structure of a frustum shape of a cone located on a lower side and a cylinder shape located on the upper side. This hard metal tip 13 has a tapered distal end portion 32 formed with a tip opening 33 and a proximal end portion 34 formed with a proximal opening 35 bored at a center of a proximal end surface 36 in communication with the tip opening 33. The tip opening 33 is also located at a center of the distal end portion 32. Since the hard metal tip 13 has a tapered lower end, the lower end easily spikes into the surface of soil or turf with less friction when the arm of the soil aeration machine is moved down. Tapered angle $A_1$ is set according to the condition for use, and preferably in a range between 15 degrees and 60 degrees, more preferably between 20 degrees and 50 degrees.

The tapered frustum shaped portion 37 is continuous to a cylindrical portion 38 whose outer diameter is substantially equal to the outer diameter of the tubular tine member 11. Thus, with this embodiment, a cylinder is formed with substantially the same outer diameter from the cylindrical portion 38 of the hard metal tip 13 to the working section 21 of the tubular tine member 11, so that this aeration tine device 10 can be easily pushed down to soil or turf without producing unnecessary friction at the connection between the hard metal tip 13 and the tubular tine member 11.

The hard metal tip 13 has a cone-shaped interior 39 with tapered angle $A_2$ designed to be 1 degree through 10 degrees. The cone-shape interior 39 is a hole connecting the tip opening 33 and the proximal opening 35 within the hard metal tip 13. Because of the cone shaped interior 39, the diameter of the tip opening 33 becomes smaller than the diameter of the proximal opening 35, so that the soil is cut at the tip opening 33 with the narrower diameter of the tip opening 33 to form soil plugs when this tine devices goes down to spike the soil or turf surface. Each soil plug having the narrow diameter of the tip opening 33, as entering inside the interior 39 of the hard metal tip 13, easily passes through the connection between the hard metal tip 13 and the tubular tine member 11 at which the diameter is much wider than that of the soil plugs. Therefore, each soil plug readily comes out of the long side ejection opening 26.

The proximal end surface 36 of the hard metal tip 13 extends in a plane perpendicular to the axial direction of the metal tip and couples in an area contact with the lower end surface 28 of the tubular tine member 11. Because the proximal end surface 36 extends perpendicularly to the axial direction, the proximal end surface 36 is easily fabricated with some machine tools. This flat proximal end surface 36 brings another advantage in application of force. Where this aeration tine device 10 is used for turf grounds upon mounted on the brackets at the arms of a soil aerator machine, the force is exerted to this aeration tine device 10 in a downward direction. If the proximal end surface is tapered and slightly eccentrically formed, the force exerted downward may be divided at the tapered surface. With this aeration tine device 10, however, no divided force occurs because the proximal end surface 36 extends perpendicularly to the axial direction and has no tapered portion.

Connection between the hard metal tip 13 and the tubular tine member 11 is done by brazing or other means. Silver brazing method is preferably used in this embodiment. Silver brazing is a joining process whereby a non-ferrous filler metal, alloy is heated to the melting temperature and distributed between two or more close-fitting parts by capillary attraction. At the liquidized temperature, the molten filler metal interacts with a thin layer of the base metal, cooling to form an exceptionally strong, sealed joint due to grain structure interaction. The silver brazed joint becomes a sandwich of different layers, each metallurgically linked to each other.

Figure 4:
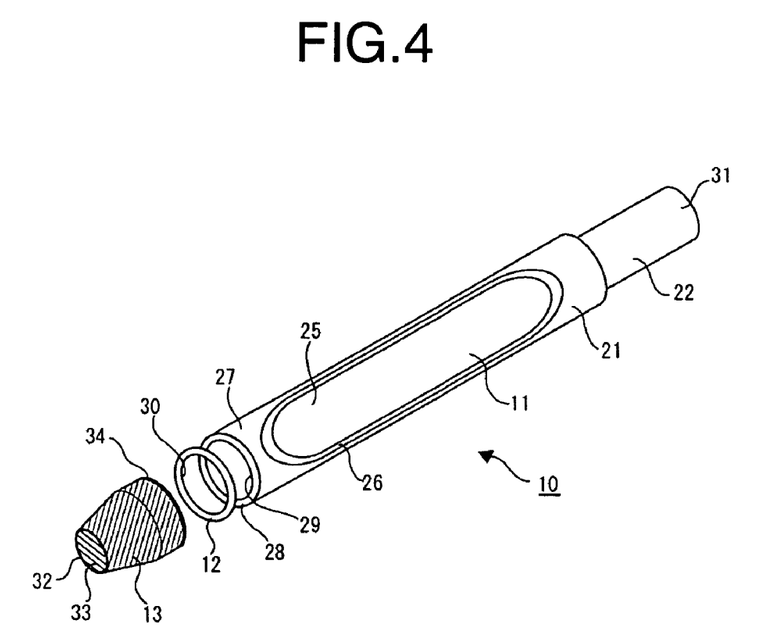
FIG. 4 is an exploded perspective view showing the aeration tine device according to an embodiment of the invention.

At the connection between the hard metal tip 13 and the tubular tine member 11, a metal foil insertion 12 is provided as shown in FIG. 4 to prevent cracks or breakdowns at the brazing portion from occurring due to difference between the thermal expansion coefficients of the hard metal tip 13 and the tubular tine member 11. The metal foil insertion 12 is made of, e.g., copper foil and is placed between the lower end surface 28 of the tubular tine member 11 and the proximal end surface 36 of the hard metal tip 13 for connecting the tubular tine member 11 with the hard metal tip 13 by silver brazing. The metal foil insertion 12 functions as a buffer layer between the tubular tine member 11 made of, e.g., a carbon steel or the like, and the hard metal tip 13 made of, e.g., tungsten carbide or the like. For the improving purposes in durability of the tine device, the metal foil insertion 12 is added between the tubular tine member 11 and the hard metal tip 13 and operates to relax stresses otherwise occurring due to difference between the thermal expansion coefficients. The metal foil insertion 12 is in a ring shape in this embodiment according to shapes of the lower end surface 28 of the tubular tine member 11 and the proximal end surface 36 of the hard metal tip 13.

Figure 5:
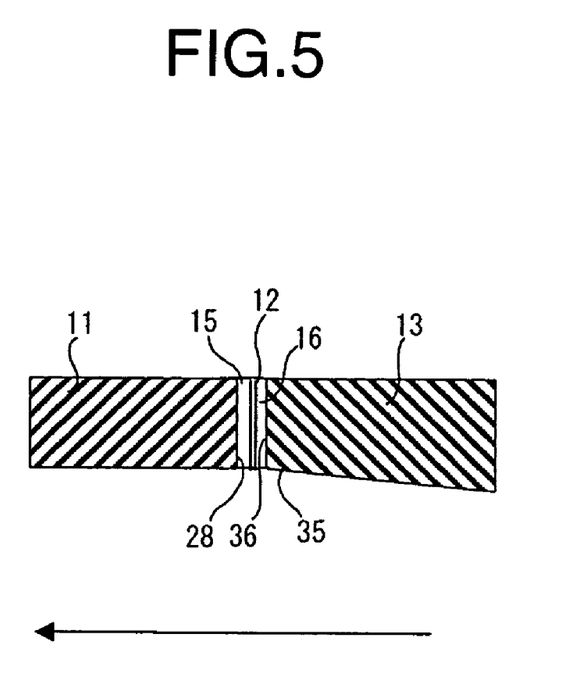
FIG. 5 is an enlarged view showing an area contact portion of the aeration tine device according to an embodiment of the invention.

In FIG. 5, illustrated is a structure around the connection between the lower end surface 28 of the tubular tine member 11 and the proximal end surface 36 of the hard metal tip 13. With the metal foil insertion 12, the tubular time member 11 is not directly coupled to the hard metal tip 13. The tubular tine member 11 is coupled in an area contact to the metal foil insertion 12 by silver brazing layer 15 while the hard metal tip 13 is also coupled in an area contact to metal foil insertion 12 by silver brazing layer 16.

In operation, the aeration tine device 10 is mounted to brackets of arms of a soil aerator machine. In general, the soil aerator machines tend to have several reciprocally moving arms, and each arm has three to five or six holding bracket portions to which the tine devices are mounted. The soil aerator machine operates to drive slowly on a site, e.g., golf course, to which aeration work is to be made.

As the arm of the soil aerator machine moves down, the hard metal tip 13 reaches a turf ground and begins to cut the ground. After the hard metal tip 13 reaches the turf ground, the hard metal tip 13 is further driven into the ground, a soil plug is cut out by the tapered hard metal tip 13 and loaded in the interior of the hard metal tip 13 and then into the tubular tine member 11. The plugs introduced into the hollow interior 25 are guided along the back slope 23 as well as the hollow interior's inner walls and smoothly come out of the long side ejection opening 26.

With this aeration tine device 10, because a cutting edge of this tine device 10 is made of the hard metal tip 13 having a high durability in comparison with the prior art, the duration of the aeration tine device 10 is much longer, and the aeration tine device 10 renders the aeration work so productive. The drive force for the tine device 10 is adequately applied from the soil aerator machine to the hard metal tip 13 where the connection between the hard metal tip 13 and the tubular tine member 11 is made via the area contact at the surfaces perpendicular to the axial direction. Because the surfaces 28, 36 for area contact are flat surfaces extending perpendicular to the axial direction, those surfaces 28, 36 are easily fabricated and generates no divided force having a vector orienting any other direction. The aeration tine device 10 of the embodiment has the substantially the same outer diameter from the cylinder portion 38 of the hard metal tip 13 to the end of the working section 21 of the tubular tine member 11, so that the tine device 10 can be smoothly pushed down and pulled up. Furthermore, with the aeration tine device 10 according to the embodiment, the soil plugs can be guided desirably at the back slope 23 as well as the hollow interior's inner walls, so that the long side ejection opening 26 can easily eject the plugs. In addition, the hard metal tip 13 has the cone shaped interior as having the larger diameter as coming closely to the proximal opening 35, or the upper end, allowing smooth flows of the soil plugs in preventing the soil plugs from stacking inside the tine device 10.

Experiments were made by the inventor to prove excellent durability of this invented aeration tine device in comparison with pipe type tine as a prior art using a golf course. The aeration tine device having a length of 7.1 inches at working section length plus a hard metal tip length, and about 2 inches attachment shaft, was used. After operating this aeration tine device for 161,400 square feet, wear of the tip of the aeration tine device was checked. As a result, the tip of the tine device according to this embodiment almost is suffered from almost no wearing. The same experiment was conducted with a pipe type conventional tine device, but apparent wearing occurred at the tip of pipe type conventional tine device even after 53,800 square feet operation. This experiment and other experiments conducted by the inventor suggest that the aeration tine device according to the embodiment has an excellent durability five or twenty time more than the pipe type conventional tine device. That is, it was proved up that the aeration tine device according to the embodiment is particularly suitable for longer, heavy use, such as golf courses, sport field, large scale parks, etc.

Although in the above embodiment, the shape of the hard metal tip is the combination of the frustum of the cone and the cylinder, the hard metal tip can be in a shape of a bullet, or double frustums of cones, or other shapes.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. An aeration tine device attached to a soil aerator, comprising:
    a tubular tine member extending along an axial direction thereof between a lower end portion and an upper end portion and having a lower opening bored at a center of a lower end surface, and a side ejection opening in communication with the lower opening, the lower end surface extending in a plane perpendicular to the axial direction; a metal tip having a tapered distal end portion formed with a tip opening and a proximal end portion formed with a proximal opening bored at a center of a proximal end surface in communication with the tip opening, the proximal end surface extending in a plane perpendicular to the axial direction and coupling in an area in contact with the lower end surface of the tubular tine member; and
    a ring-shaped metal foil insert between the lower end surface of the tubular tine member and the proximal end surface of the metal tip in a plane perpendicular to the axial direction of the tine member for connecting the tubular tine member with the metal tip by brazing.

2. The aeration tine device according to claim 1, wherein the proximal end surface has an outer diameter substantially equal to an outer diameter of the lower end portion of the tubular tine member.

3. The aeration tine device according to claim 1, wherein the diameter of the tip opening is narrower than the diameter of the proximal opening.

4. The aeration tine device according to claim 1, wherein the metal tip has a frustum portion of a cone shape located on a lower side and a cylindrical portion located on an upper side.

5. The aeration tine device according to claim 1, wherein the metal tip and the tubular tine member are connected with each other by brazing.

6. The aeration tine device according to claim 1, wherein the metal tip is essentially made of tungsten carbide, titanium carbide, or cermet.

7. The aeration tine device according to claim 1, wherein the tubular tine member is essentially made of carbon steel, alloy steel, stainless steel, or any combination of those steels.

8. The aeration tine device according to claim 1, wherein the metal foil insert is essentially made of copper, and wherein the metal tip and the tubular tine member are connected by silver brazing.

9. An aeration tine device attached to a soil aerator, comprising:
    a tubular tine member extending along an axial direction thereof between a lower end portion and an upper end portion and having a lower opening bored at a center of a lower end surface, and a side ejection opening in communication with the lower opening, the lower end surface extending in a plane perpendicular to the axial direction; the side ejection opening having a back slope formed in a united body with the tubular tine member rising in a curving manner from an inner surface of the tubular tine member;
    a metal tip having a tapered distal end portion formed with a tip opening and a proximal end portion formed with a proximal opening bored at a center of a proximal end surface in communication with the tip opening, the proximal end surface extending in a plane perpendicular to the axial direction and coupling in an area in contact with the lower end surface of the tubular tine member; and
    a ring-shaped metal foil insert placed between the lower end surface of the tubular tine member and the proximal end surface of the metal tip in a plane perpendicular to the axial direction of the tine member for connecting the tubular tine member with the metal tip by brazing.

10. The aeration tine device according to claim 9, wherein an inner surface extends in a cylindrical shape and the back slope rises from a portion of the inner surface opposite to the side ejection opening with an angle of 20 to 40 degrees.

11. The aeration tine device according to claim 9, wherein the inner surface extends in a cylindrical shape and is wider toward the side ejection opening.

* * * * *